United States Patent
Hosur et al.

(10) Patent No.: US 12,390,754 B2
(45) Date of Patent: Aug. 19, 2025

(54) FILTER ASSEMBLY AND METHOD

(71) Applicant: Transportation IP Holdings, LLC, Norwalk, CT (US)

(72) Inventors: Mahantesh Mallappa Hosur, Bangalore (IN); Uday Karmarkar, Erie, PA (US); Sudeep Pradhan Sadananda Rao, Bangalore (IN); Anand Gosbal, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 673 days.

(21) Appl. No.: 17/200,523

(22) Filed: Mar. 12, 2021

(65) Prior Publication Data

US 2022/0288518 A1 Sep. 15, 2022

(51) Int. Cl.
*B01D 46/00* (2022.01)
*B01D 46/62* (2022.01)
*B01D 35/00* (2006.01)

(52) U.S. Cl.
CPC ..... *B01D 46/0002* (2013.01); *B01D 46/0046* (2013.01); *B01D 46/62* (2022.01); *B01D 2271/022* (2013.01)

(58) Field of Classification Search
None
See application file for complete search history.

(56) References Cited

U.S. PATENT DOCUMENTS

2010/0275561 A1* 11/2010 Lundquist ............... B04C 3/06
524/570
2017/0341003 A1* 11/2017 Smith ............... B01D 46/521

OTHER PUBLICATIONS

Klujszo "Design of a Stationary Guide Vane Air Swirler" Science Direct, Minerals Engineering, vol. 12, No. 11, pp. 1375-1392, 1999 (18 pages).

* cited by examiner

*Primary Examiner* — Allison G Fitzsimmons
(74) *Attorney, Agent, or Firm* — K&L Gates LLP (57) ABSTRACT

A filter assembly and method include a body having first second surfaces defining a cavity between the surfaces. A conduit system is disposed within the cavity. The conduit system includes an inlet disposed at the first surface and receives a fluid mixture comprising a fluid and debris. The conduit system is shaped to separate a first portion of the fluid and a mixture of a second portion of the fluid and the debris. The conduit system includes a first outlet disposed at a position within the cavity and a second outlet disposed at the second surface of the body. The conduit system directs the mixture of the second portion of the fluid and the debris out of the conduit system and into the cavity of the body via the first outlet, and directs the first portion of the fluid out of the conduit system via the second outlet.

20 Claims, 10 Drawing Sheets

FILTER ASSEMBLY AND METHOD

BACKGROUND

Technical Field

The subject matter described herein relates to filter assemblies and related methods.

Discussion of Art

Filters may be designed to separate two or more different components that move together through the filter. For example, a spin or inertial filter may separate one material from another by controlling flow characteristics as the materials move through the filter. Filters may separate one fluid from another fluid, may separate solid particles from a fluid, may separate one type of solid material from another type of solid material, or the like. Filters may be used to control fluid that may be moved from one region to another, and may be used within various applications such as, but not limited to, vehicle systems, buildings, mechanical equipment, etc.

Existing filters may be manufactured and assembled using plural different methods. As one example, plural injection molded spin tubes may be press-fit into metallic and/or polymer housings of different shapes and sizes. As another example, a first half of the filter (e.g., a front half) may be injection molded, and a second half of the filter (e.g., a rear half) may be separately injection molded, and the two halves may be press-fit together to form the filter. As another example, the spin tubes may be injection molded in two pieces (e.g., an upper or upstream centrifuge component and a lower or downstream centrifuge component) and may be individually press-fit into a panel or box to form the filter. The need to assemble front and rear halves of a filter adds to manufacturing complexity and cost, and the complex assemblage of components may result in decreased performance levels over time. Therefore, it may be desirable to provide a filter assembly that differs from existing filter assemblies.

BRIEF DESCRIPTION

In one or more embodiments, a filter assembly includes a body having a first surface and a second surface. The body defines a cavity between the first and second surfaces. A conduit system is disposed within the cavity of the body. The conduit system includes an inlet disposed at the first surface of the body and receives a fluid mixture comprising a fluid and debris via the inlet. The conduit system is shaped to separate a first portion of the fluid and a mixture of a second portion of the fluid and the debris present in the second portion of the fluid. The conduit system includes a first outlet disposed at a position within the cavity and a second outlet disposed at the second surface of the body. The conduit system directs the mixture of the second portion of the fluid and the debris out of the conduit system and into the cavity of the body via the first outlet, and the conduit system directs the first portion of the fluid out of the conduit system and out of the body via the second outlet.

In one or more embodiments, a method includes receiving a fluid mixture within a conduit system via an inlet of the conduit system. The fluid mixture includes a fluid and debris. The conduit system is disposed within a body comprising a first surface and a second surface. The body defines a cavity between the first and second surfaces. A first portion of the fluid is separated from a mixture of a second portion of the fluid and the debris present in the second portion of the fluid within the conduit system. The mixture of the second portion of the fluid and the debris is directed out of the conduit system and into the cavity of the body via a first outlet of the conduit system. The first portion of the fluid is directed out of the conduit system and out of the body via a second outlet of the conduit system.

In one or more embodiments, a filter assembly includes a body having a first surface and a second surface, and defining a cavity between the first and second surfaces. A conduit system is disposed within the cavity of the body and formed as a unitary structure within the body. The conduit system includes a first conduit and a second conduit fluidly coupled with the first conduit. The first conduit extends between a first end and a second end. The first end of the first conduit is operably coupled with the first surface of the body. The second conduit extends between a first end and a second end. The second end of the second conduit is operably coupled with the second surface of the body. The conduit system includes an inlet disposed at the first end of the first conduit, a first outlet disposed at the second end of the first conduit and fluidly coupled with the cavity of the body, and a second outlet disposed at the second end of the second conduit. The conduit system receives a fluid mixture including a fluid and debris via the inlet, and is shaped to separate the fluid from the debris within the conduit system. A portion of the debris is directed out of the first conduit and into the cavity of the body via the first outlet. A portion of the fluid is directed out of the first conduit toward the second conduit, and out of the second conduit via the second outlet.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a filter assembly and method of directing fluid and debris through the filter assembly. The filter assembly includes a body having plural surfaces with a cavity disposed within the body and defined by the plural surfaces. A conduit system is disposed within the cavity of the body and includes an inlet disposed at a first surface of the body, a first outlet disposed at a position within the cavity, and a second outlet disposed at a second surface of the body.

The conduit system receives a fluid mixture that includes a fluid and debris via the inlet. The conduit system is shaped to separate a first portion of the fluid and a mixture of a second portion of the fluid with the debris present in the second portion of the fluid. The conduit system directs the mixture of the second portion of the fluid and the debris out of the conduit system and into the cavity of the body via the first outlet. The conduit system directs the first portion of the fluid out of the conduit system via the second outlet.

Figure 1:
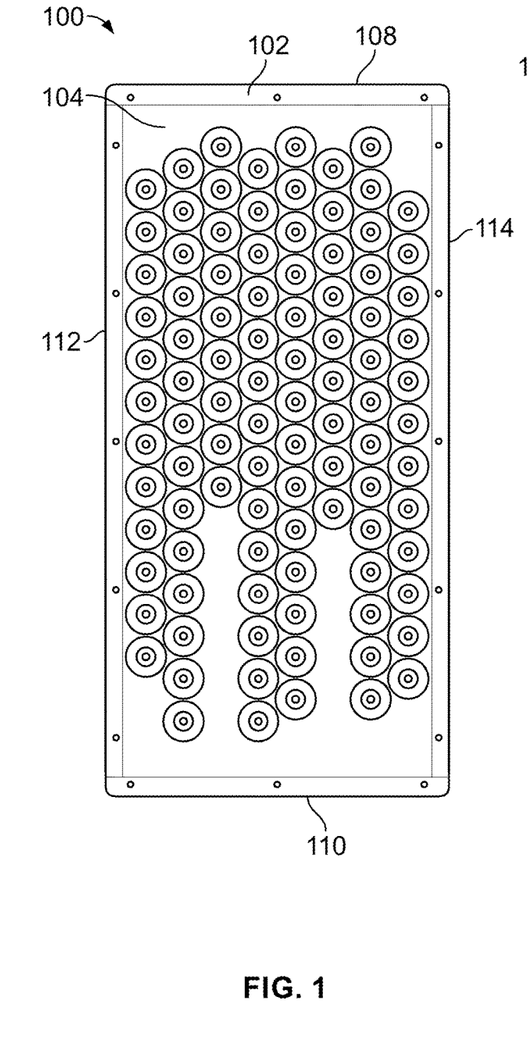
FIG. 1 illustrates a front view of a filter assembly in accordance with one embodiment.
Figure 2:
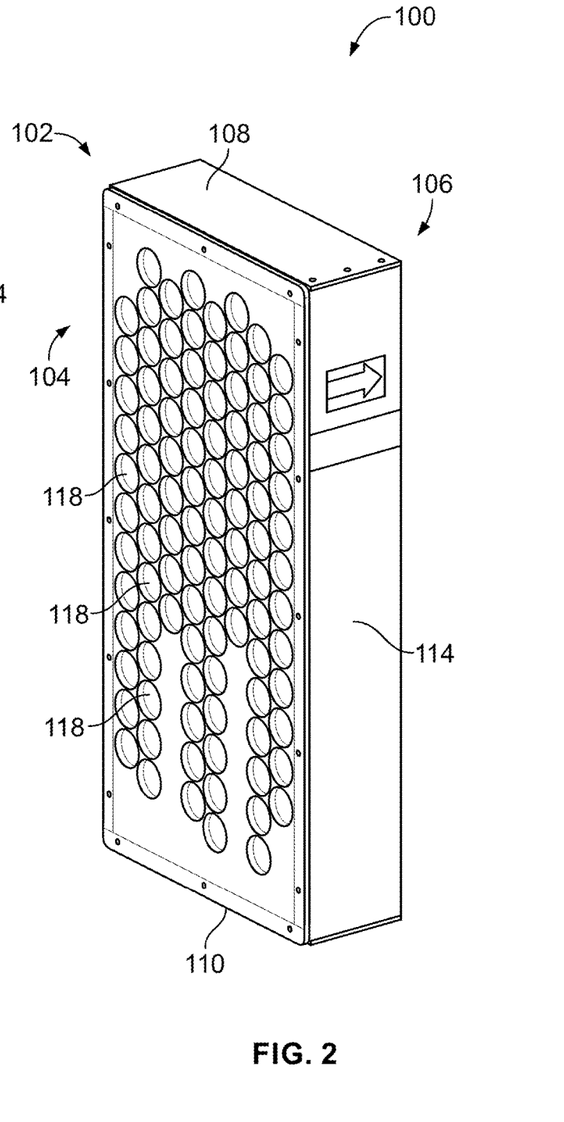
FIG. 2 illustrates a perspective view of the filter assembly shown in FIG. 1.

FIG. 1 illustrates a front view of one example of a filter assembly 100 in accordance with one embodiment. FIG. 2 illustrates a perspective view of the filter assembly. The filter assembly may be used or disposed onboard a vehicle system such as a rail vehicle, a car, or other passenger vehicle, a mining vehicle, a bus, an aircraft, agricultural equipment, or another off-highway vehicle. Optionally, the filter assembly may be disposed within a facility such as a laboratory, a storage facility, a school, an office building, a gymnasium, an arena, or any alternative building or facility that may require filtration.

The filter assembly includes a body that has a first surface 104 and a second surface 106 that is substantially planar with the first surface. The first and second surfaces are coupled via top and bottom surfaces 108, 110, and first and second sides 112, 114, that form the body. For example, the top and bottom surfaces and first and second sides form a frame around the body of the filter assembly. In the illustrated embodiment, the body has a substantially elongated cube shape, but alternatively may have any shape and/or size. The first surface may also be referred to as a front surface, and the second surface may also be referred to as a rear surface. The plural sides and surfaces of the body define a cavity (not shown in FIGS. 1 and 2) that extends substantially between the first and second surfaces within the body.

The filter assembly includes plural openings 118 that correspond with plural conduit systems (not shown in FIGS. 1 and 2) disposed within the cavity of the body. The openings receive a fluid mixture and direct the fluid mixture into the corresponding conduit system. The fluid mixture may comprise a fluid and debris that is mixed or combined with the fluid. The fluid may be a liquid-phase of a fluid, a gas-phase of a fluid, a liquid-gas phase mixture of the fluid, or the like. The fluid may be atmospheric air, industrial gases, or the like. The debris may be contaminants, pollutants, foreign particles, dust, sand, or the like, that are mixed or combined with the fluid.

In the illustrated embodiment of FIGS. 1 and 2, the filter assembly includes plural openings, each opening representing a conduit system, with the openings disposed in a patterned array of rows and columns across the first surface. Additionally, each of the openings is substantially the same size and shape as each other opening. Alternatively, the filter assembly may include any number of openings (and corresponding conduit systems) disposed in any unique and/or patterned arrangement across the first surface. Optionally, one or more openings may have a unique shape and/or size relative to the other openings of the filter assembly. The patterned and/or random array of the openings (and corresponding conduit systems disposed within the body) may be arranged based on mounting or coupling methods to couple the filter assembly with another system, such as a vehicle system, industrial mechanical equipment, or the like.

Optionally, patterned and/or random array of the openings may be arranged based on an amount of the fluid mixture and location of the fluid mixture that is directed toward the first surface of the filter assembly. For example, the filter assembly may include a larger concentration of openings at a location of the first surface that is determined to receive a larger volume or higher flow rate of the fluid mixture relative to a different area of the first surface. For example, the placement of the openings may be based on one or more flow characteristics of the fluid mixture (e.g., pressure, volume, flow rate, temperature, or the like).

Figure 3:
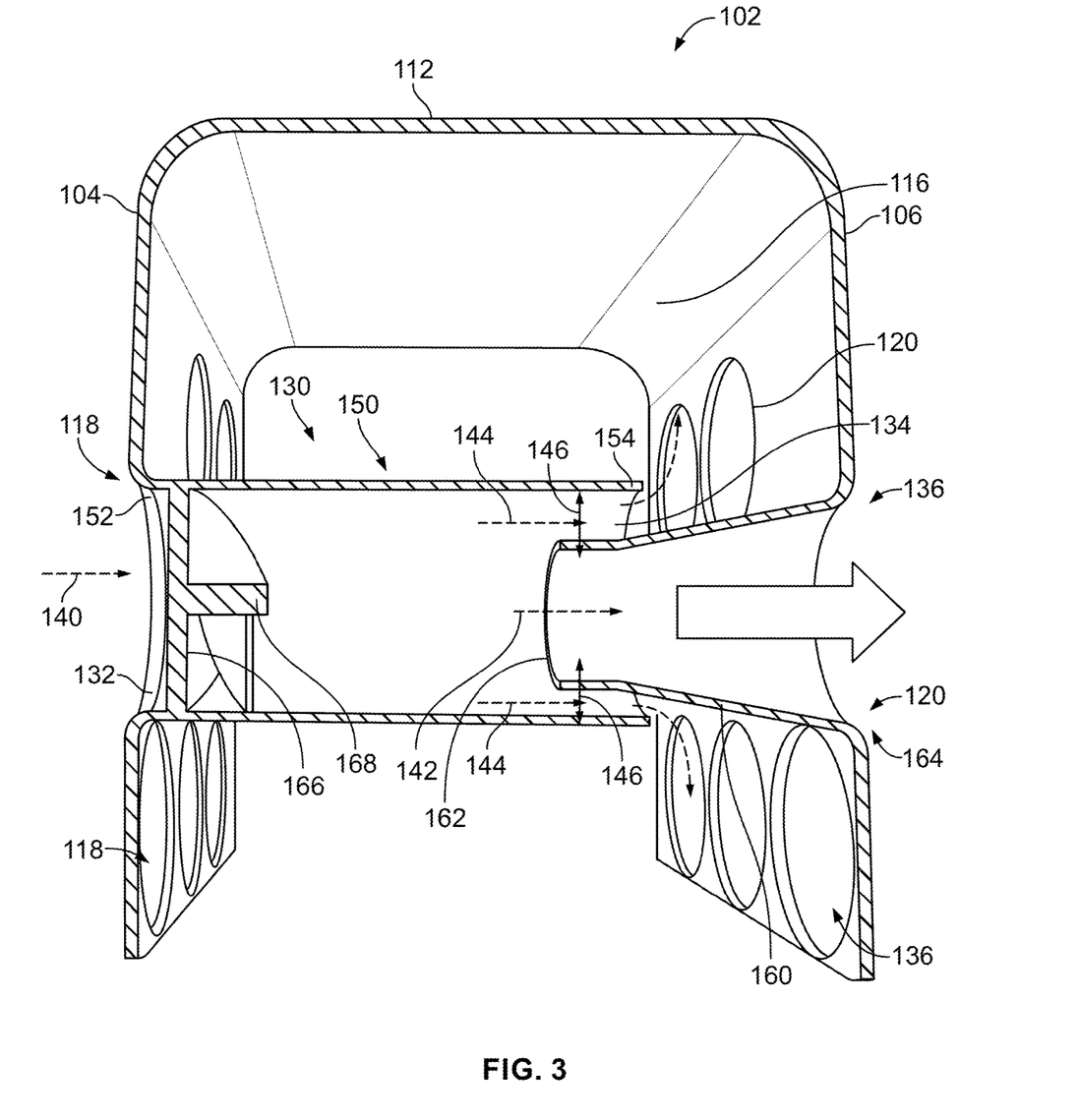
FIG. 3 illustrates a partial cross-sectional view of the filter assembly shown in FIG. 1.
Figure 4:
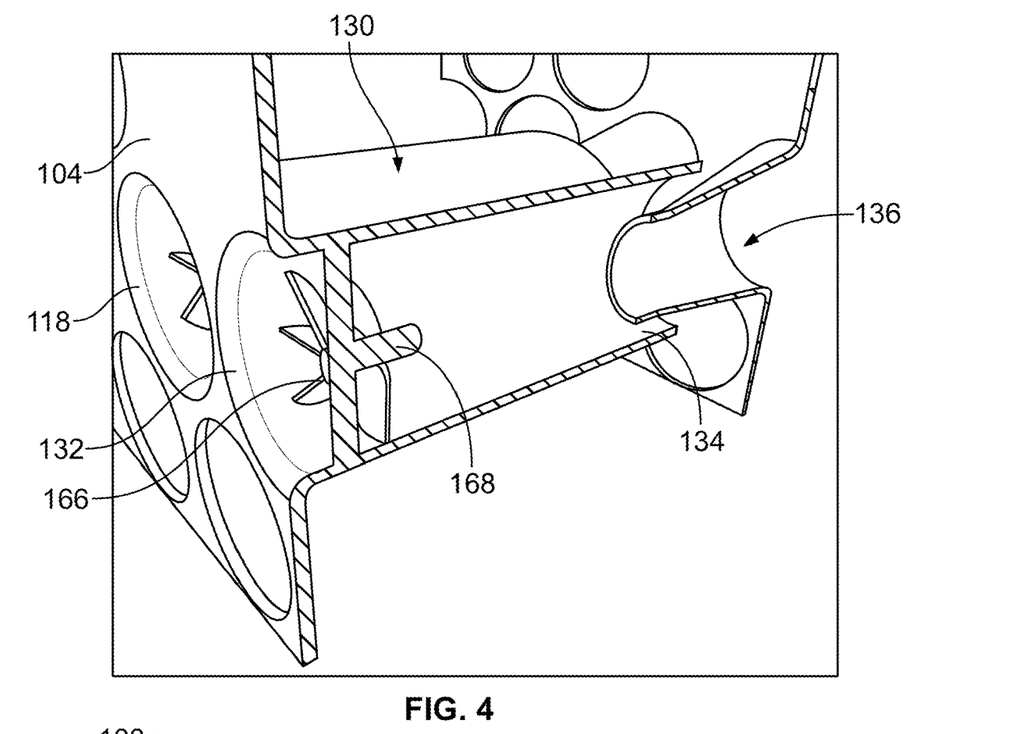
FIG. 4 illustrates a perspective cross-sectional view of the filter assembly shown in FIG. 1.

FIG. 3 illustrates a partial cross-sectional view of the filter assembly shown in FIGS. 1 and 2. FIG. 4 illustrates a perspective cross-sectional view of the filter assembly. The body defines a cavity 116 or open area within the body disposed between the first and second surfaces and the top, bottom, and side surfaces. The conduit system 130 is disposed within the cavity of the body. In the illustrated embodiment of FIG. 3, a single conduit system is illustrated for clarity, but alternatively, the filter assembly may include plural conduit systems disposed within the body.

The conduit system includes an inlet 132 disposed proximate the opening of the first surface. For example, the conduit system receives the fluid mixture 140 via the inlet. The fluid mixture includes the fluid mixed or combined with the debris. The conduit system is shaped to separate a first portion of the fluid 142 from a mixture 144 of a second portion of the fluid mixed of combined with the debris. The conduit system includes at least two outlets. A first outlet 134 is disposed at a location between the first and second surfaces of the body, and a second outlet 136 is disposed proximate the second surface of the body. The mixture of the second portion of the fluid mixed with the debris is directed out of the conduit system via the first outlet. For example, the first outlet directs the second portion of the fluid and the debris out of the first conduit and into the cavity of the filter assembly. In one or more embodiments, the cavity may be fluidly coupled with another system component (not shown) such as a blower that may direct the mixture of the second portion of the fluid and the debris out of the cavity. For example, the blower may clean the filter assembly by removing at least some of the mixture of the fluid and debris out of the cavity of the filter assembly for rejection, for use within an alternative system, or the like.

The first portion of the fluid is directed out of the conduit system via the second outlet. For example, the first portion of the fluid is directed out of the first conduit and toward the second conduit, and out of the body of the filter assembly via the second outlet disposed proximate an opening 120 of the second surface. The first portion of the fluid may be directed toward a fluid control device (not shown) such that the cleaned first portion of the fluid may be used for and/or within a system.

In the illustrated embodiment of FIG. 3, the openings of the first surface are substantially axially aligned with the openings of the second surface. Additionally, the conduit system extends substantially linearly along an axis of the conduit system between the openings of the first and second surfaces. For example, the conduit systems extend in a substantially horizontal direction. Alternatively, one or more conduit systems, or a portion of one or more conduit systems, may extend in a non-linear direction between the openings of the first and second surfaces. For example, a portion of one of the conduit systems may include a bend to change a direction of flow of the fluid mixture within the conduit system. Optionally, the openings of the first surface may be axially off-set from the openings of the second surface such that the conduit systems extend in a non-horizontal direction between the openings.

The conduit system includes a first conduit 150 and a second conduit 160 fluidly coupled with the first conduit. The first conduit extends between a first end 152 disposed proximate the opening of the first surface and a second end 154 disposed at a location or position between the first and second surfaces of the body. The second conduit extends between a first end 162 disposed at a location or position between the first and second surfaces of the body, and a second end 164 disposed proximate the opening of the second surface. In one or more embodiments, the first conduit may extend a length or distance between the first and second ends that is greater than or less than a length or distance between the first and second ends of the second conduit. Optionally, the first conduit may extend a length that is substantially the same as a length of the second conduit.

The inlet of the conduit system is disposed at the first end of the first conduit, the first outlet of the conduit system is disposed at the second end of the first conduit, and the second outlet of the conduit system is disposed at the second end of the second conduit. The second end of the first conduit is fluidly coupled with the first end of the second conduit.

The first and second conduits are sized and shaped to control one or more flow characteristics of the fluid mixture, the first portion of the fluid, or the second portion of the fluid mixed with the debris as the fluid and debris move within the conduit system. For example, the conduit system may be shaped, sized, and/or include one or more features or components that may control a pressure, a flow rate, a direction of movement, a volumetric flow rate, velocity, turbulence, rotational forces, or the like, of the fluid mixture, the first portion of the fluid, the second portion of the fluid, and/or the debris.

The first conduit is sized and shaped to control the flow characteristics of the fluid mixture and to promote the separation of at least some of the debris from the fluid. In one or more embodiments, the first conduit may be shaped to direct the fluid mixture in one or more cyclonic and/or centrifugal directions to separate the debris from the fluid. The first conduit may be referred to as a spin filter, an inertial filter, a centrifugal filter, or the like. For example, the debris may be directed toward an interior surface of the first conduit and a portion of the fluid may be directed toward a center axis of the first conduit.

The second conduit may be shaped to control one or more flow characteristics of the first portion of the fluid 142 that is directed from the first conduit toward the second conduit, and out of the filter assembly. In the illustrated embodiment, the second conduit has an increasing cross-sectional size between the first end and the second end of the second conduit. For example, an opening at the first end of the second conduit is smaller than an opening at the second end of the second conduit such that the second conduit has a substantially conical shape between the first and second ends. The second conduit may be shaped and/or sized to control a pressure, a flow rate, a direction of movement, a volumetric flow rate, velocity, turbulence, rotational forces, or the like, of the first portion of the fluid that is directed out of the filter assembly. For example, the second conduit may control one or more flow characteristics of the first portion of the fluid based on where the first portion of the fluid may be directed out of the filter assembly. The first portion of the fluid (e.g., the cleaned fluid or the fluid that is mixed with a reduced amount of debris relative to the fluid mixture directed into the filter assembly) may be directed out of the filter assembly to be used for and/or within another system.

In the illustrated embodiment of FIG. 3, the first end of the second conduit is disposed within the second end of the first conduit such that a portion of the first conduit overlaps with a portion of the second conduit. For example, the second conduit is shaped and sized such that a portion of the second conduit extends within a cavity of the first conduit. Optionally, the first conduit may be shaped and sized such that the second end of the first conduit may extend within a cavity of the second conduit. Optionally, the first and second conduits may be shaped and sized such that one of the conduits may not extend into the other.

The conduit system includes one or more gaps 146 disposed between the second end of the first conduit and the first end of the second conduit. The gaps are formed by the spaces between the first conduit and the second conduit. For example, the size of the second end of the first conduit is greater than a size of the first end of the second conduit such that the gap(s) are formed between an external surface of the second conduit and an internal surface of the first conduit. For example, the first and second conduits are positioned to establish the gaps between the first and second conduits. The gaps form the first outlet of the conduit system. For example, the mixture of the second portion of the fluid 144 mixed with the debris is directed out of the conduit system and into the cavity via the gaps between the second end of the first conduit and first end of the second conduit. In the illustrated embodiment of FIG. 3, the first end of the second conduit is substantially disposed at a center of the second end of the first conduit such that a gap extends between an exterior perimeter of the first end of the second conduit and an internal perimeter of the second end of the first conduit. Optionally, the first and/or second conduit may have an alternative shape and/or size forming one or more different gaps having common and/or unique shapes, positions, or the like.

In one or more embodiments, the filter assembly may include one or more structures disposed within the conduit system. The structures may change or control one or more flow characteristics of the fluid and/or the debris. In the illustrated embodiment of FIG. 3, the filter assembly includes a first structure 166 and a second structure 168 disposed proximate the inlet of the conduit system. The first structure may represent one or more blades that may be static or dynamic. The blades may be shaped to control flow characteristics of the fluid mixture as the fluid mixture is directed into the conduit system. In the illustrated embodiment of FIG. 4, the conduit system includes eight blades (three of the blades are hidden based on the cross-sectional view of the conduit system), but alternatively may include any number of blades disposed at any uniform and/or random spacing about a center axis of the first conduit.

Optionally, the blades may be disposed at common pitch angles relative to each other, or one or more blades may be positioned having a unique pitch angle relative to one of the other blades.

The second structure may represent a body (e.g., a conical body as illustrated in FIGS. 3 and 4) to control flow characteristics of the fluid mixture. The second structure is operably coupled with the first structure, and extends a distance away from the inlet into the first conduit of the conduit system.

Figure 5:
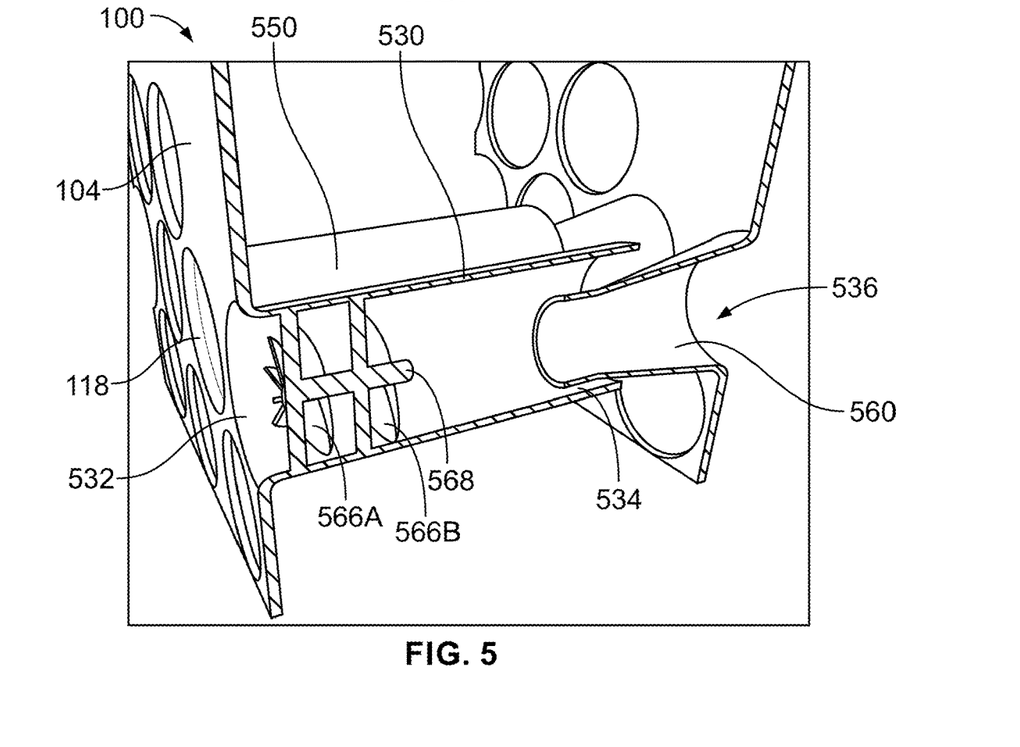
FIG. 5 illustrates a partial cross-sectional view of a filter assembly in accordance with one embodiment.

Optionally, the conduit system may include first and second structures having alternative configurations and/or arrangements. For example, FIG. 5 illustrates a cross-sectional view of a conduit system 530 in accordance with one embodiment. The conduit system includes an inlet 532 disposed at the opening 118 of the first surface 104 of the body, a first outlet 534 disposed at a location within the cavity of the body, and a second outlet 536 disposed at an opening of the second surface of the body. The conduit system includes a first conduit 550 and a second conduit 560 downstream of the first conduit. The conduit system includes plural structures 566 disposed within the first conduit. In the illustrated embodiment, a first structure 566A is disposed between the inlet and a second structure 566B in a direction of flow of the fluid mixture. The first structure represents a first set of blades or airfoils, and the second structure represents a second set of blades or airfoils. The first set of blades includes a number of blades that is greater than a number of blades included in the second set. Optionally, the first set of blades may be positioned at angular positions that are different than angular positions of the second set of blades. Optionally, the first set of blades may have a shape and/or size that is different than the shape and/or size of the second set of blades. Optionally, the conduit system may include more than two sets of blades disposed within the first conduit.

In one or more embodiments, the conduit system may include a third structure 568 disposed downstream of the first and second structures. In one or more embodiments, the second structure may represent a body (e.g., a conical body) to control flow characteristics of the fluid mixture. The third structure is operably coupled with the second structure, and extends a distance away from the inlet into the first conduit of the conduit system.

Figure 6A:
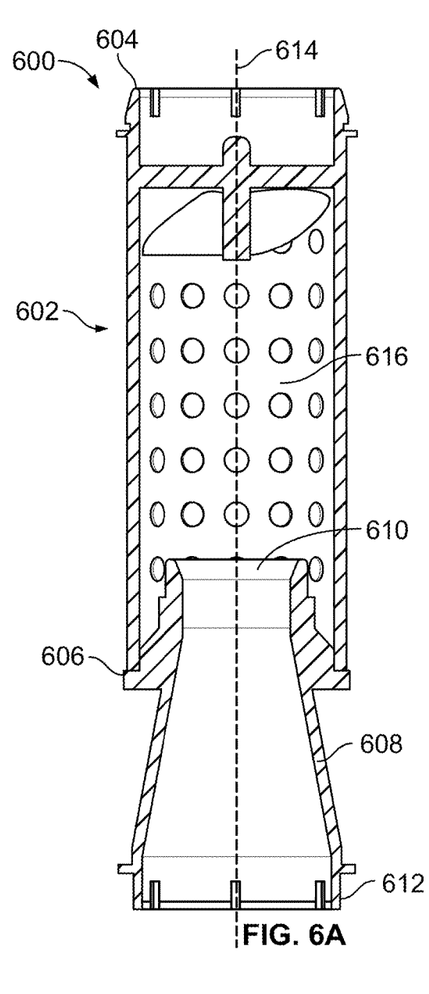
FIG. 6A illustrates one example of structures disposed within a filter assembly.
Figure 6B:
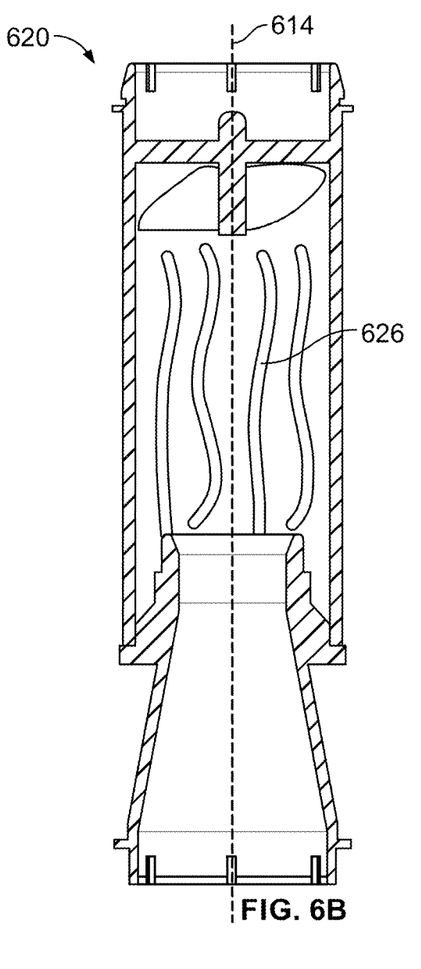
FIG. 6B illustrates one example of structures disposed within a filter assembly.
Figure 6C:
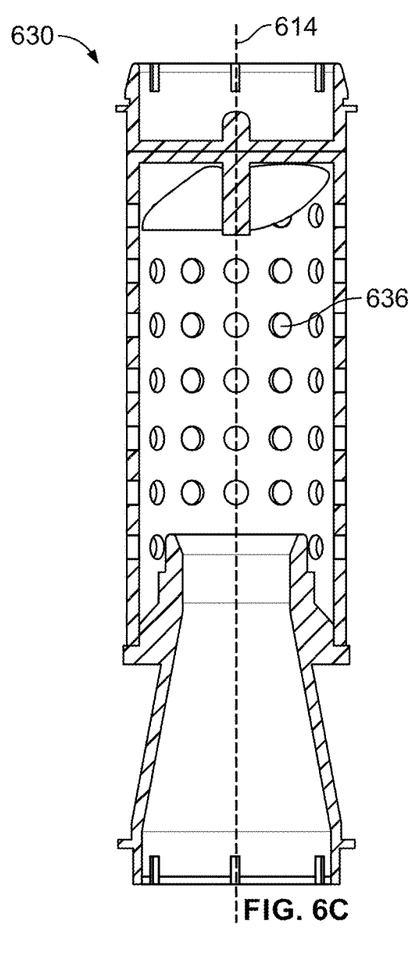
FIG. 6C illustrates one example of structures disposed within a filter assembly.

In one or more embodiments, one or more internal surfaces, or one or more portions of the internal surfaces of the conduit system may be textured to change or control one or more characteristics of the fluid mixture, the first portion of the fluid, the second portion of the fluid, and/or the debris. Optionally, the conduit system may include one or more structures or obstructing components operably coupled to the internal surfaces. For example, FIGS. 6A through 6C illustrate examples of structures disposed within the conduit system. FIG. 6A illustrates a conduit system 600 that includes a first conduit 602 and a second conduit 608. The first conduit extends between a first end 604 and a second end 606, and the second conduit extends between a first end 610 and a second end 612. The conduit system extends along a center axis 614. The fluid mixture is directed into the conduit system into the first end of the first conduit. The conduit system includes plural structures 616 disposed within the first conduit.

In the illustrated embodiment of FIG. 6A, the structures are substantially round protrusions that extend a distance into an internal surface of the first conduit. For example, the structures are depressions, dimples, recesses, or the like that extend into the internal surface of the first conduit. The structures are positioned in a patterned array within the first conduit, but alternatively may be positioned in an alternative patterned and/or random configuration.

FIG. 6B illustrates the conduit system including alternative structures 626. In the illustrated embodiment of FIG. 6B, the structures are elongated structures that are operably coupled with and extend away from the internal surfaces of the first conduit. The structures have a wavy or curved arrangement between the first and second end of the first conduit. Additionally, the first conduit includes plural structures disposed at different positions around a perimeter of the first conduit.

FIG. 6C illustrates the conduit system including alternative structures 636. In the illustrated embodiment of FIG. 6C, the structures are protrusions that extend a distance away from the internal surface of the first conduit and into the conduit system. For example, the structures are bulges, lumps, or the like. Like the structures shown in FIG. 6A, the structures illustrated in FIG. 6C are arranged in a patterned array within the first conduit, but alternatively may be positioned in an alternative patterned and/or random configuration.

The structures shown in FIGS. 6A through 6C may be referred to as drag features or drag reducing features such that the structures are positioned to interfere with the fluid mixture to change flow characteristics of the fluid mixture, to promote the separation of the debris from the fluid, to control bleed improved filtration, to control a pressure and/or pressure drops within the conduit system, the or the like. For example, the drag features may reduce an amount of drag of the fluid mixture moving within the conduit system relative to the first and second conduits being devoid the drag features. Optionally, one or more structures may be positioned or disposed within the second conduit. Optionally, the conduit system may include different styles of structures disposed within the conduit system at different locations within the conduit system.

In one or more embodiments, the filter assembly may include one or more mesh screens or other components operably coupled with or disposed within the conduit system. The mesh screen may permit the fluid to pass through and prohibit at least some of the debris from passing through to separate the debris from the fluid. For example, the conduit system may include a mesh screen disposed at the first end of the second conduit such that some of the debris mixed with the first portion of the fluid is prohibited from being directed into the second conduit. Optionally, the conduit system may include any alternative debris filtering mechanism or configuration.

In one or more embodiments, the filter assembly may be disposed onboard a vehicle system that may be operably and/or communicatively coupled with a back-office server of a positive vehicle control (PVC) system or positive control system (PCS), or a "negative control system (NCS). For example, in a PCS, vehicles have onboard systems that prevent the vehicles from performing one or more operations unless a signal is received from an off-board source granting permission to perform the operation, and in a NCS, vehicles may include onboard systems that allow the vehicle to perform the one or more operations unless a signal is received from an off-board source prohibiting the performance of the one or more operations.

As one example, the back-office server may determine that an amount of the fluid mixture directed into the filter assembly may need to change. The vehicle system may include a moveable cover, screen, or other surface (not shown) that may control an amount of the fluid mixture that is directed toward the openings of the filter assembly. The back-office server may remotely control the cover or surface to move to a closed or one or more open positions to control the amount of the fluid mixture directed toward the filter assembly. For example, when the cover is in a closed position, the cover prohibits the fluid mixture from being directed toward the filter assembly. Optionally, moving the cover or surface between the closed and one or more open positions may control a direction of movement of the fluid mixture, a velocity of the fluid mixture, a pressure of the fluid mixture directed toward the filter assembly, or the like.

In one or more embodiments, the body and the one or more conduit systems of the filter assembly may be manufactured additively as a single, unitary structure. For example, the filter assembly may be formed as a unitary embodiment, unitary component, or the like. The one or more conduit systems, the body, the one or more structures disposed within the conduit system, and the one or more textured internal surfaces of the conduit system may all be additively manufactured as a single, unitary structure. Forming the filter assembly as a single, unitary structure eliminates the need to assembly front and rear halves of a filter, such as an existing filter. Eliminating the need to assembly front and rear halves of the filter reduces a manufacturing complexity and cost relative to forming the filter assembly additively as a unitary structure.

In one or more embodiments, one or more sides and/or surfaces of the body may be manufactured of a material composition and the one or more conduit systems may be manufactured of the same material composition. Optionally, a portion of the body and/or a portion of the conduit system may be manufactured of a different material composition but one that may be compatible with the material composition of the other portions of the filter assembly. One or more portions of the filter assembly may be manufactured of a metal or metallic alloy, an engineered material, a polymer material, or the like. For example, the conduit system may be formed of a first material composition, and one or more surfaces of the body may be formed of the same first material composition or a second material composition that is different than the first material composition. The material of the one or more portions of the filter assembly may be based on one or more design criteria or requirements such as flow characteristic requirements, the chemical composition of the fluid and/or debris, an environment in which the filter assembly is disposed, a life-span requirement, or the like.

In one or more embodiments, the conduit system may be additively manufactured as a unitary structure, and the body of the filter assembly, or one or more surfaces of the body, may be additively manufactured as a unitary structure separate from the unitary structure of the conduit system. The separate structures may be operably coupled via one or more fastening or coupling mechanisms, or the like.

Additively manufacturing the filter assembly allows the assembly to have varying three-dimensional shapes, to have different filtering techniques (e.g., different cavities, conduits), or the like, within the same unitary component. Additive manufacturing can involve joining or solidifying material under computer control to create a three-dimensional object, such as by adding liquid molecules or fusing powder grains with each other. Examples of additive manufacturing include three-dimensional (3D) printing, rapid prototyping (RP), direct digital manufacturing (DDM), selective laser melting (SLM), electron beam melting (EBM), direct metal laser melting (DMLM), or the like. Alternatively, the filter assembly, or a portion of the assembly, can be formed in another manner.

In one or more embodiments, the size and/or shape of the filter assembly may require the filter assembly to be additively manufactured in two or more different parts or components which may be assembled together to form the filter assembly. For example, the area of the filter assembly may be about 0.1 square-meters ($m^2$), about 0.5 $m^2$, about 1 $m^2$, about 5 $m^2$, about 10 $m^2$, or the like.

Figure 7:
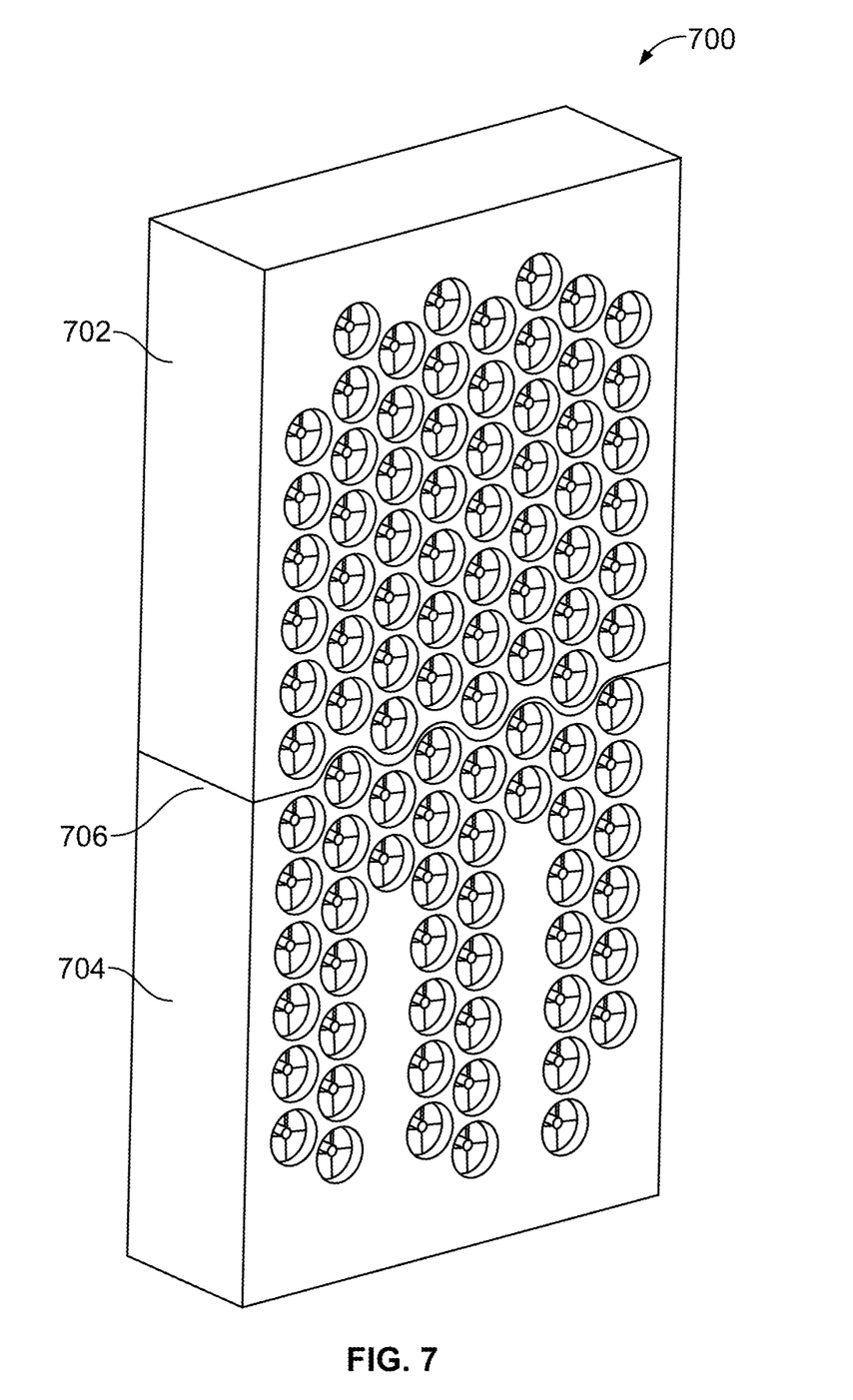
FIG. 7 illustrates a perspective view of a filter assembly in accordance with one embodiment.
Figure 8:
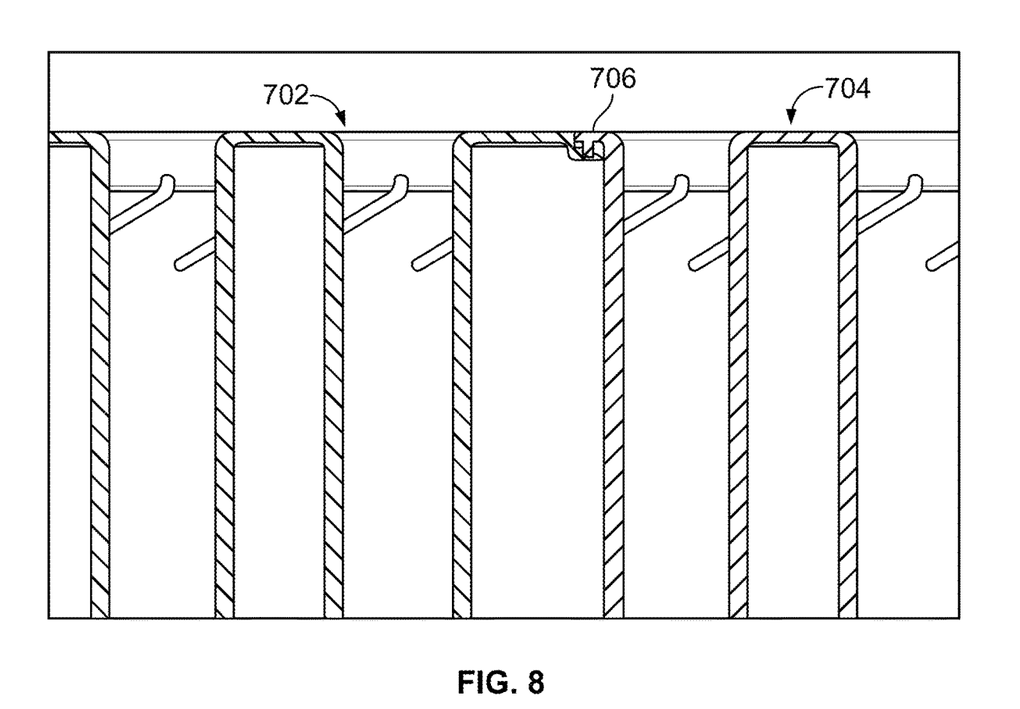
FIG. 8 illustrates a partial cross-sectional view of the filter assembly shown in FIG. 7 in accordance with one embodiment.
Figure 9:
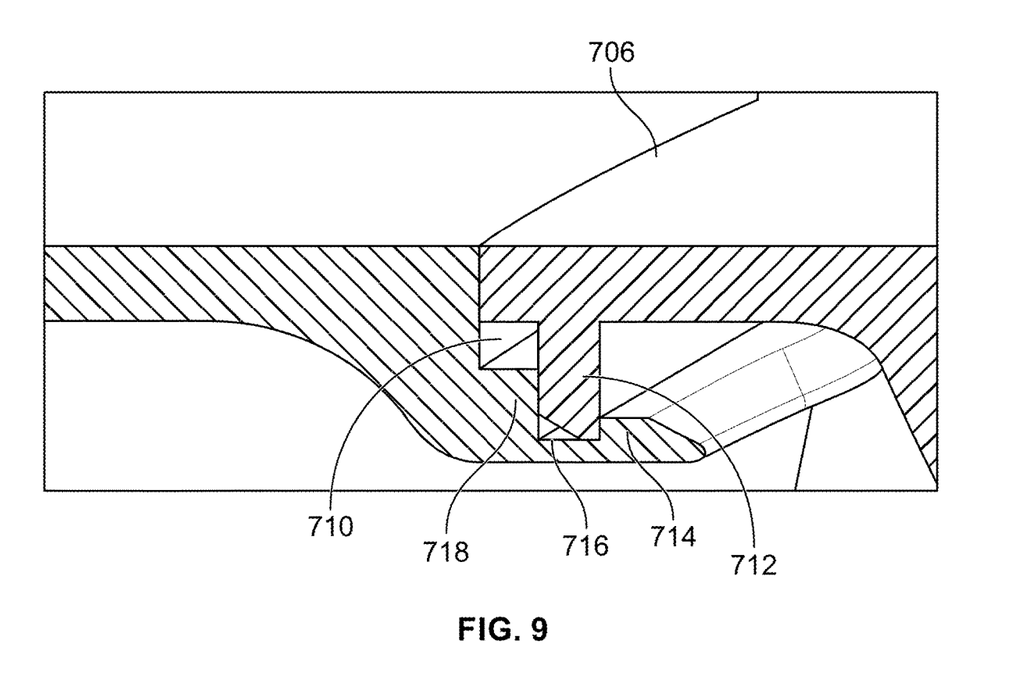
FIG. 9 illustrates a magnified view of the filter assembly shown in FIG. 7.

FIG. 7 illustrates a filter assembly 700 in accordance with one embodiment. FIGS. 7 through 9 illustrate one example of assembling two components together to form the filter assembly. The body of the filter assembly includes a first component 702 and a second component 704. In the illustrated embodiment, the first and second components are substantially the same size and shape, but alternatively the first component may have a shape and/or a size that is different than the second component. The first and second components may be independently additively manufactured or formed, and may be operably coupled with each other at a mating interface 706. FIG. 8 illustrates a cross-sectional view of the mating interface of the filter system, and FIG. 9 illustrates a magnified view of the mating interface.

In the illustrated embodiment, the first component includes a mating structure that includes a receiving feature 716 that may operate as a recess or pocket, disposed between a first surface 718 and a second surface 714. A mating protrusion 712 of the second component is received within the receiving feature, and linear movement of the mating protrusion is prohibiting based on the mating protrusion interfering with the first and second surfaces. For example, the second component of the body may be prohibited to move, or an amount of movement of the second component relative to the first component may be reduced by the mating protrusion interfering with the first and second surfaces of the mating structure of the first component.

Figure 10:
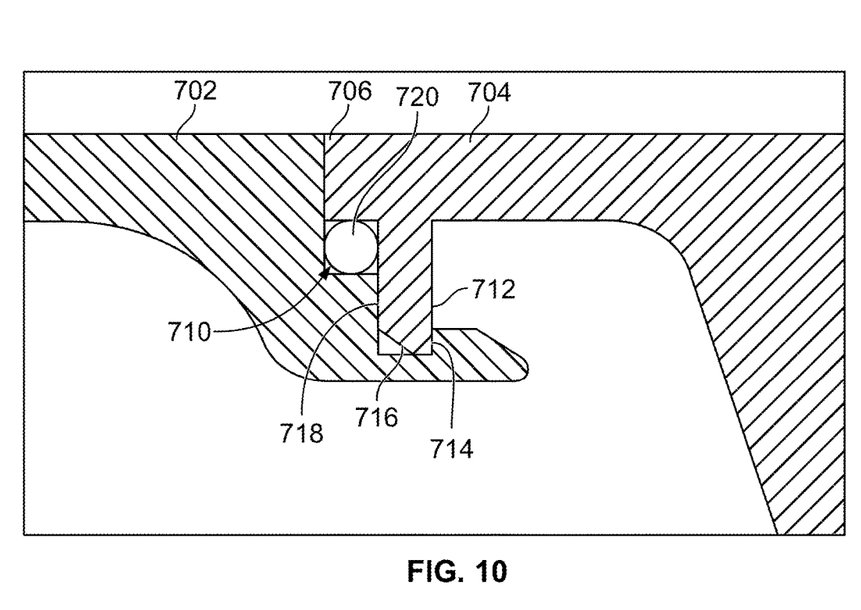
FIG. 10 illustrates a partial cross-sectional view of a filter assembly in accordance with another embodiment.

In one or more embodiments, the filter assembly 700 may include a cavity 710 or pocket defined by the first and second components coupled with each other. For example, FIG. 10 illustrates one embodiment of the filter assembly. The filter assembly may include a gasket 720 disposed within the cavity formed and defined by the first and second components. The gasket may be an environmental gasket or seal to control an amount of solids and/or fluids that may be directed into and/or out of the filter system via the mating interface. In the illustrated embodiment of FIG. 10, the gasket has a substantially circular cross-sectional shape, and substantially fills the cavity formed by the first and second components of the body of the filter assembly. Optionally, the cavity may have an alternative shape and/or size, and the gasket may have an alternative shape and/or size.

Figure 11:
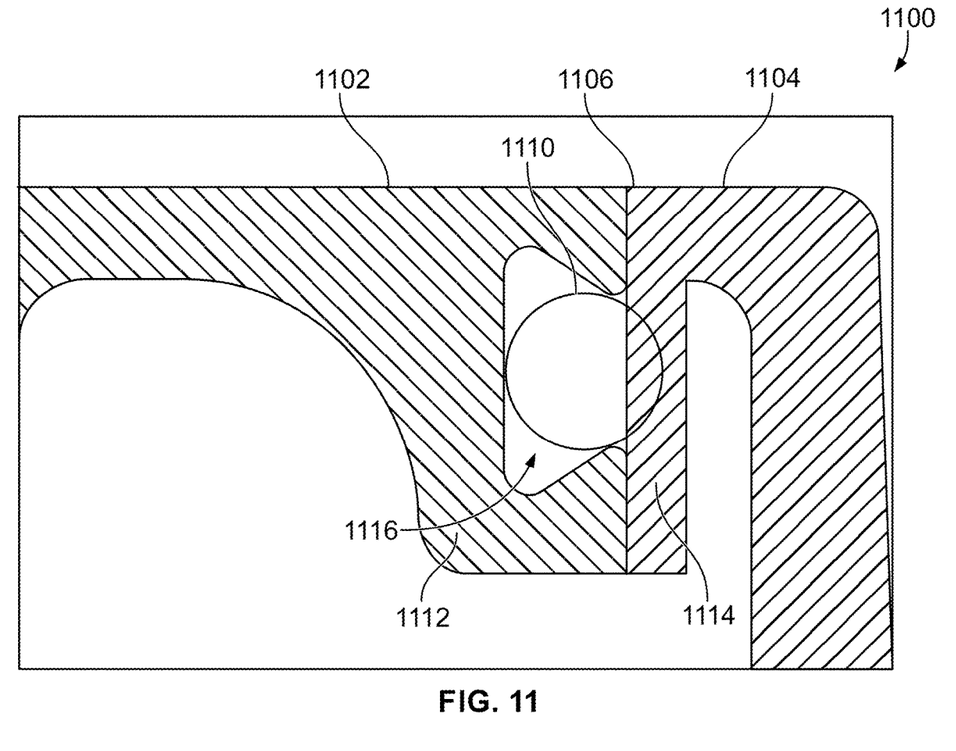
FIG. 11 illustrates a cross-sectional view of a filter assembly in accordance with one embodiment.

For example, FIG. 11 illustrates a cross-sectional view of a filter assembly 1100 in accordance with one embodiment. The filter assembly includes a body that includes a first component 1102 and a second component 1104. A mating feature 1112 of the first component is operably coupled with a mating feature 1114 of the second component. The mating features of the first and second components define a cavity 1116 or recess. The filter assembly includes a gasket 1110 disposed within the cavity. In the illustrated embodiment, the gasket has a substantially circular cross-sectional shape, and the cavity has a non-circular cross-sectional shape. The gasket is shaped to interfere with surfaces of the first and second component to control form a seal around a perimeter of a mating interface 1106 between the first and second components. For example, the gasket is configured to control an amount of fluids and/or solids that may be directed into and/or out of the filter assembly via the mating interface.

Figure 12:
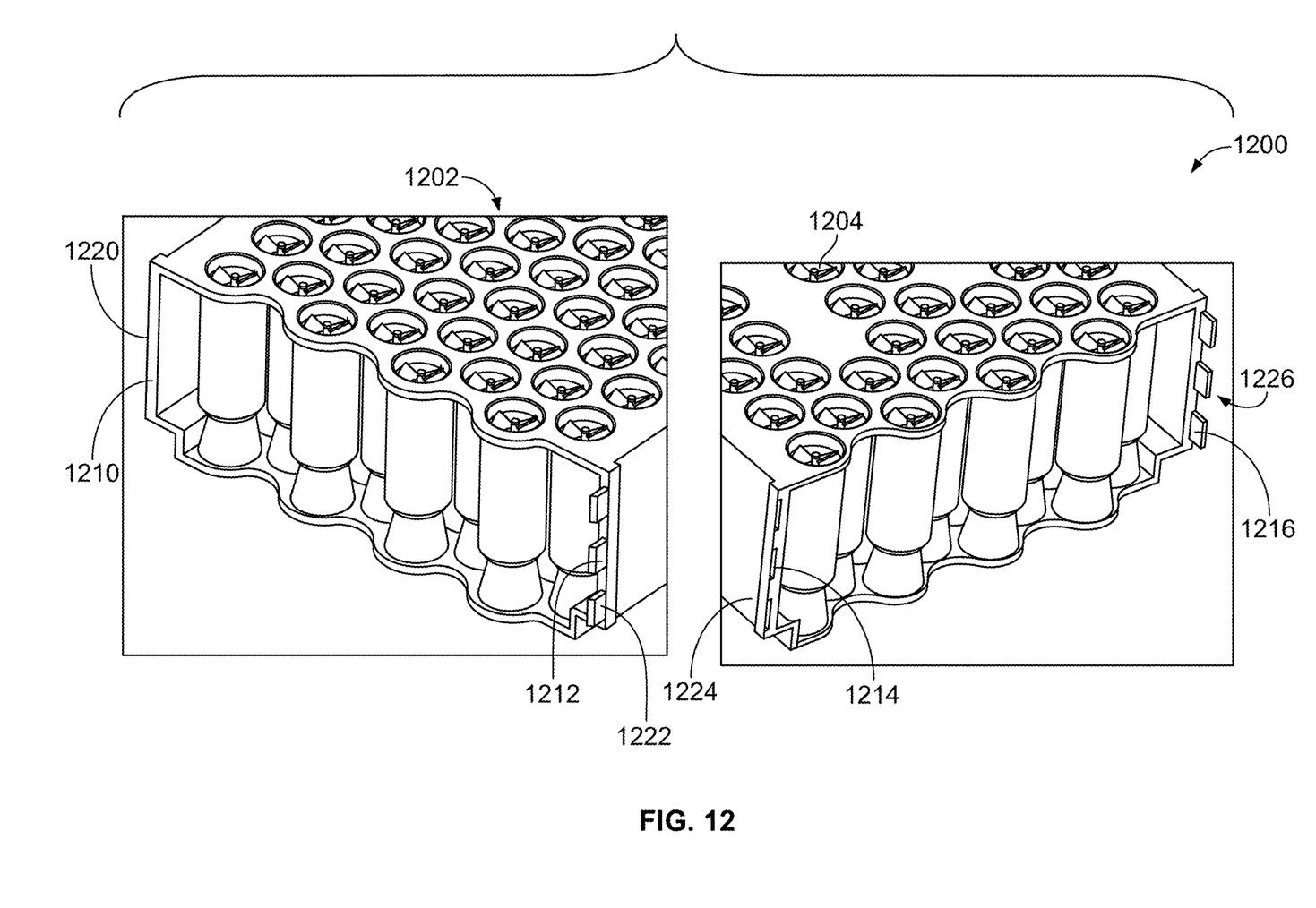
FIG. 12 illustrates an exploded view of a filter assembly in accordance with one embodiment.
Figure 13:
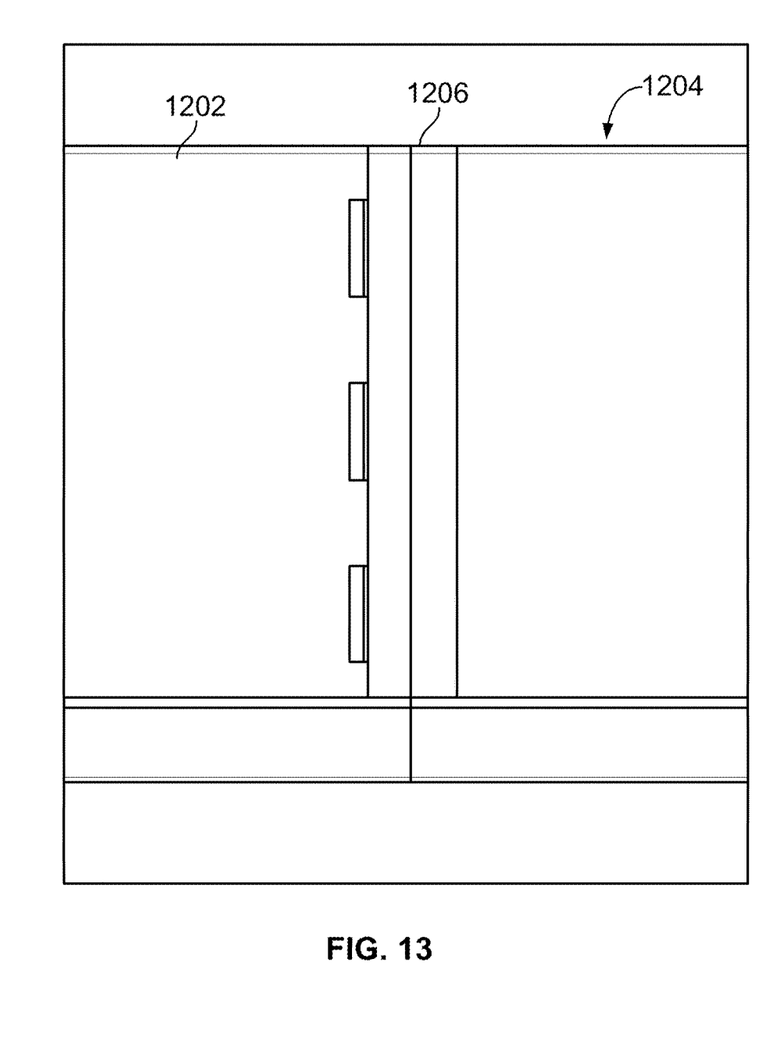
FIG. 13 illustrates an assembled side view of the filter assembly shown in FIG. 12.
Figure 14:
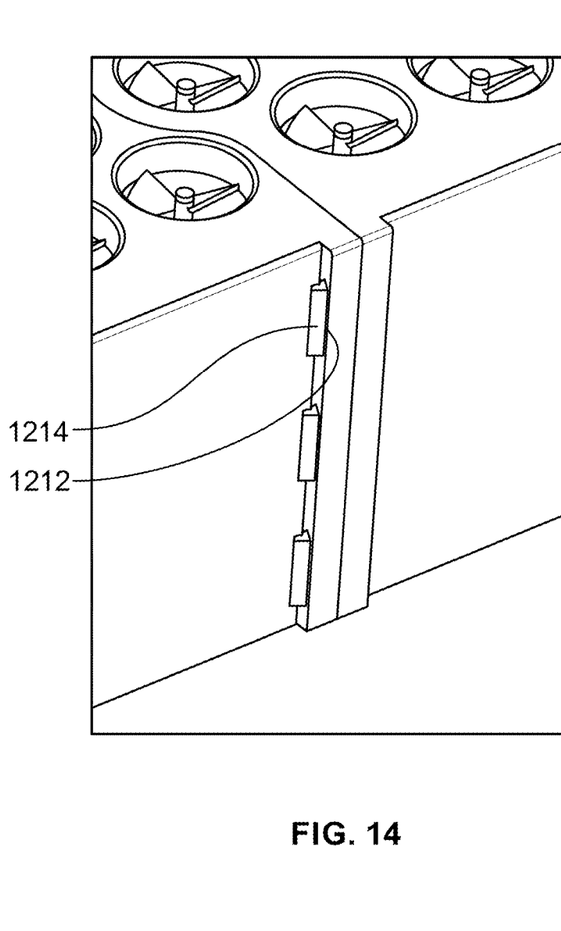
FIG. 14 illustrates an assembled perspective view of the filter assembly shown in FIG. 12.

FIG. 12 illustrates a partial exploded view of a filter assembly 1200 in accordance with one embodiment. FIGS. 12 through 14 illustrate another example of the two components assembled together to form the filter assembly. The body of the filter assembly includes a first component 1202 and a second component 1204. The first and second components may be independently additively manufactured or formed, and may be operably coupled with each other at a mating interface 1206.

The first component includes first fasteners 1210 disposed on a first side 1220 of the component, and second fasteners 1212 disposed on a second side 1222 of the component. Additionally, the second component includes first fasteners 1214 disposed on a first side 1224 of the second component and second fasteners 1216 disposed on a second side 1226 of the second component.

In the illustrated embodiment, the first fasteners of the first and second components are female fasteners, and the second fasteners of the first and second components are male fasteners. The female fasteners of the first component are configured to receive the male fasteners of the second component, and the female fasteners of the second component are configured to receive the male fasteners of the first component. The first component includes female and male fasteners or coupling mechanisms, and the second component includes female and male fasteners or coupling mechanisms. Optionally, one of the first or second component may include only female fasteners and the other component may include only male fasteners.

In one or more embodiments, the filter assembly may be formed of two or more components that may be operably coupled together via one or more joining techniques such as, but not limited to, a snap-fit design (snaps disposed on interior surfaces and/or exterior surfaces of the body), single and/or double pin-and-groove mating designs, or the like. In one or more embodiments, the filter assembly may include one or more gaskets disposed at a mating interface of the different components.

Figure 15:
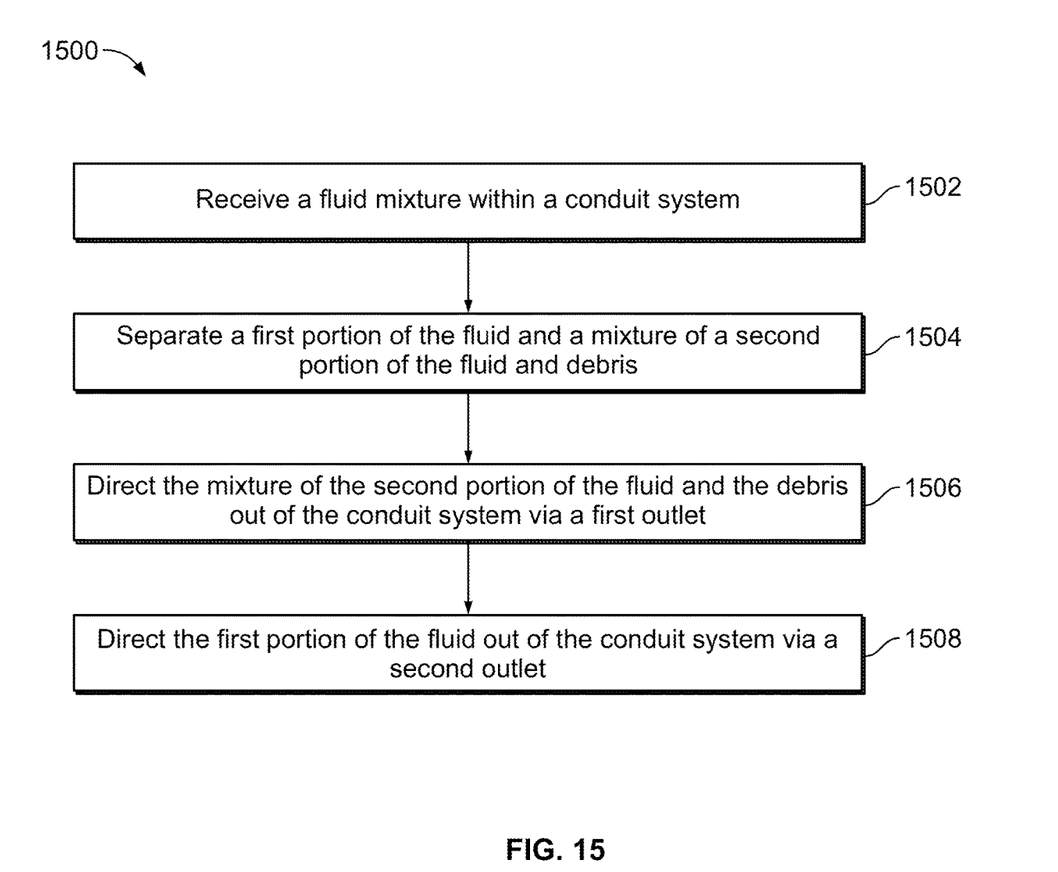
FIG. 15 illustrates a flowchart of one example of a method for directing fluid and debris through a filter assembly.

FIG. 15 illustrates a flowchart 1500 of one example of a method for directing fluid and debris through a filter assembly (e.g., a method of at least partially filtering debris from a fluid, using a filter assembly). The operations described in connection with the method may be performed by the filter assembly shown in FIG. 3, or an alternative filter assembly.

At 1502, a fluid mixture is received within a conduit system of a filter assembly. The conduit system may be one of plural different conduit systems disposed within a cavity of a body of the filter assembly. For example, the body may include at least a first surface and a second surface, with the cavity defined by at least the first and second surfaces. The conduit system may extend between the first and second surfaces of the body. The fluid mixture may be a mixture of a fluid and debris. The fluid may be in a liquid-phase, a gas-phase, or a liquid-gas-phase mixture. The debris may be contaminants, particles, dust, or the like.

The conduit system includes a first conduit fluidly coupled with a second conduit located downstream of the first conduit in a direction of movement of the fluid mixture. The conduit system includes an inlet disposed at the first surface of the body that directs the fluid mixture into the first conduit. The conduit system includes a first outlet disposed at a location within the cavity. For example, the first outlet may be at a junction or mating area of the first and second conduits. The conduit system also includes a second outlet disposed at the second surface of the body.

At 1504, a first portion of the fluid is separated from a mixture of a second portion of the fluid and the debris. The first portion and the mixture of the second portion and the debris may be separated from each other within the first conduit. For example, the first conduit may be shaped to control one or more flow characteristics of the fluid mixture, the first portion of the fluid, the second portion of the fluid, the debris, or the like. In one or more embodiments, the first conduit may be referred to as a spin filter such that the first conduit is shaped to direct the fluid mixture in one or more cyclonic directions. For example, the debris mixed with the second portion of the fluid may be directed toward an interior surface of the first conduit and the first portion of the fluid may be directed toward a center axis of the first conduit.

At 1506, the mixture of the second portion of the fluid and the debris is directed out of the conduit system via the first outlet. The mixture is directed out of the conduit system and into the cavity of the body of the filter assembly. In one or more embodiments, the cavity may be fluidly coupled with another outlet of the filter assembly such that the debris and the second portion of the fluid may be directed out of the filter assembly for rejection, for use within an alternative system, or the like.

At 1508, the first portion of the fluid is directed out of the first conduit and into the second conduit of the conduit system, and is directed out of the conduit system via the second outlet. In one or more embodiments, the first portion of the fluid may be directed toward a fluid control device or another system such that the cleaned first portion of the fluid may be used for and/or within a system.

In one or more embodiments of the subject matter described herein, a filter assembly includes a body having a first surface and a second surface. The body defines a cavity between the first and second surfaces. A conduit system is disposed within the cavity of the body. The conduit system includes an inlet disposed at the first surface of the body and receives a fluid mixture comprising a fluid and debris via the inlet. The conduit system is shaped to separate a first portion of the fluid and a mixture of a second portion of the fluid and the debris present in the second portion of the fluid. The conduit system includes a first outlet disposed at a position within the cavity and a second outlet disposed at the second surface of the body. The conduit system directs the mixture of the second portion of the fluid and the debris out of the conduit system and into the cavity of the body via the first outlet, and the conduit system directs the first portion of the fluid out of the conduit system and out of the body via the second outlet.

Optionally, the conduit system may include a first conduit and a second conduit fluidly coupled with the first conduit. The first conduit extends between a first end and a second end, and the second conduit extends between a first end and a second end. The second end of the first conduit is fluidly coupled with the first end of the second conduit.

Optionally, the inlet of the conduit system may be disposed at the first end of the first conduit, the first outlet of the conduit system may be disposed at the second end of the first conduit, and the second outlet of the conduit system may be disposed at the second end of the second conduit.

Optionally, the second end of the first conduit may be disposed at a position within the cavity between the first and second surfaces.

Optionally, the first end of the second conduit may be disposed at a position within the cavity between the first and second surfaces.

Optionally, the first conduit and the second conduit may be positioned to establish a gap between the second end of the first conduit and a first end of the second conduit.

Optionally, the conduit system may be configured for the mixture of the second portion of the fluid and the debris to be directed out of the first conduit through the gap between the second end of the first conduit and the first end of the second conduit.

Optionally, the body and the conduit system may be additively formed as a unitary structure.

Optionally, the conduit system may be shaped to control one or more flow characteristics of one or more of the fluid mixture, the first portion of the fluid, or the mixture of the second portion of the fluid and the debris within the conduit system.

Optionally, the filter assembly may include a structure disposed within the conduit system. The structure may change one or more flow characteristics of one or more of the fluid mixture, the first portion of the fluid, or the mixture of the second portion of the fluid and the debris within the conduit system.

Optionally, a portion of at least one internal surface of the conduit system may be textured to control one or more characteristics of one or more of the fluid mixture, the first portion of the fluid, or the mixture of the second portion of the fluid and the debris within the conduit system.

Optionally, the conduit system may be a first conduit system, and the filter assembly may include plural conduit systems disposed within the cavity of the body.

Optionally, the first and second surfaces of the body may be manufactured of a material composition, and the conduit system may be manufactured of the same material composition.

In one or more embodiments of the subject matter described herein, a method includes receiving a fluid mixture within a conduit system via an inlet of the conduit system. The fluid mixture includes a fluid and debris. The conduit system is disposed within a body comprising a first surface and a second surface. The body defines a cavity between the first and second surfaces. A first portion of the fluid is separated from a mixture of a second portion of the fluid and the debris present in the second portion of the fluid within the conduit system. The mixture of the second portion of the fluid and the debris is directed out of the conduit system and into the cavity of the body via a first outlet of the conduit system. The first portion of the fluid is directed out of the conduit system and out of the body via a second outlet of the conduit system.

Optionally, the conduit system may include a first conduit and a second conduit fluidly coupled with the first conduit. The first conduit may extend between a first end and a second end, and the second conduit may extend between a first end and a second end. The second end of the first conduit may be fluidly coupled with the first end of the second conduit.

Optionally, the method may include forming the body and the conduit system as a unitary structure.

Optionally, the method may include changing one or more flow characteristics of one or more of the fluid mixture, the first portion of the fluid, or the mixture of the second portion of the fluid and the debris within the conduit system.

Optionally, the conduit system may be a first conduit system. A portion of the fluid mixture may be received within plural conduit systems via inlets of the plural conduit systems. The plural conduit systems may be disposed within the cavity of the body.

In one or more embodiments of the subject matter described herein, a filter assembly includes a body having a first surface and a second surface, and defining a cavity between the first and second surfaces. A conduit system is disposed within the cavity of the body and formed as a unitary structure within the body. The conduit system includes a first conduit and a second conduit fluidly coupled with the first conduit. The first conduit extends between a first end and a second end. The first end of the first conduit is operably coupled with the first suface of the body. The second conduit extends between a first end and a second end. The second end of the second conduit is operably coupled with the second surface of the body. The conduit system includes an inlet disposed at the first end of the first conduit, a first outlet disposed at the second end of the first conduit and fluidly coupled with the cavity of the body, and a second outlet disposed at the second end of the second conduit. The conduit system receives a fluid mixture including a fluid and debris via the inlet, and is shaped to separate the fluid from the debris within the conduit system. A portion of the debris is directed out of the first conduit and into the cavity of the body via the first outlet. A portion of the fluid is directed out of the first conduit toward the second conduit, and out of the second conduit via the second outlet.

Optionally, the first and second surfaces of the body may be manufactured of a material composition, and the conduit system may be manufactured of the same material composition.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the clauses if they have structural elements that do not differ from the literal language of the clauses, or if they include equivalent structural elements with insubstantial differences from the literal language of the clauses.

What is claimed is:

1. A filter comprising:
    a one-piece, continuous, unitary structure defining:
        a body comprising a first surface and a second surface, the body defining a cavity between the first and second surfaces; and
        a conduit system disposed within the cavity of the body, the conduit system comprising an inlet disposed at the first surface of the body, the conduit system configured to receive a fluid mixture comprising a fluid and debris via the inlet, the conduit system shaped to separate a first portion of the fluid and a mixture of a second portion of the fluid and the debris present in the second portion of the fluid, the conduit system comprising a first outlet disposed at a position within the cavity and a second outlet disposed at the second surface of the body,
    wherein the conduit system is configured to direct the mixture of the second portion of the fluid and the debris out of the conduit system and into the cavity of the body via the first outlet, and
    wherein the conduit system is configured to direct the first portion of the fluid out of the conduit system and out of the body via the second outlet, wherein the conduit system comprises a first conduit and a second conduit fluidly coupled with the first conduit, the first conduit comprises:
        a tubular body defining a central axis;
        an elongate body disposed along the central axis of the tubular body;
        one or more than one blade extending from the elongate body; and
        one or more than one drag feature disposed on or in an internal surface of the tubular body, wherein the elongate body, the one or more than one blade, and the one or more than one drag feature control one or more characteristics of one or more of the fluid mixture, the first portion of the fluid, or the mixture of the second portion of the fluid and the debris within the conduit system.

2. The filter of claim 1, wherein the first conduit extends between a first end and a second end, and the second conduit extends between a first end and a second end, the second end of the first conduit fluidly coupled with the first end of the second conduit.

3. The filter of claim 2, wherein the inlet of the conduit system is disposed at the first end of the first conduit, the first outlet of the conduit system is disposed at the second end of the first conduit, and the second outlet of the conduit system is disposed at the second end of the second conduit.

4. The filter of claim 2, wherein the second end of the first conduit is disposed at a position within the cavity between the first and second surfaces.

5. The filter of claim 2, wherein the first end of the second conduit is disposed at a position within the cavity between the first and second surfaces.

6. The filter of claim 2, wherein the first conduit and the second conduit are positioned for establishing a gap between the second end of the first conduit and the first end of the second conduit.

7. The filter of claim 6, wherein the conduit system is configured for the mixture of the second portion of the fluid and the debris to be directed out of the first conduit through the gap between the second end of the first conduit and the first end of the second conduit.

8. The filter of claim 1, wherein a portion of at least one internal surface of the conduit system is textured to control one or more characteristics of one or more of the fluid mixture, the first portion of the fluid, or the mixture of the second portion of the fluid and the debris within the conduit system.

9. The filter of claim 1, wherein the conduit system is a first conduit system, wherein the one-piece, unitary, structure defines plural conduit systems disposed within the cavity defined by the body.

10. The filter of claim 1, wherein the first and second surfaces of the body are manufactured of a material composition, and the conduit system is manufactured of the same material composition.

11. A filter comprising:
    a continuous unitary structure defining:
        a body comprising a first surface and a second surface, the body defining a cavity between the first and second surfaces; and
        a conduit system disposed within the cavity of the body, the conduit system comprising a first conduit and a second conduit fluidly coupled with the first conduit, the first conduit extending between a first end and a second end, the second conduit extending between a first end and a second end, the conduit system comprising an inlet disposed at the first end of the first conduit, a first outlet disposed at the second end of the first conduit and fluidly coupled with the cavity of the body, and a second outlet disposed at the second end of the second conduit, the conduit system configured to receive a fluid mixture comprising a fluid and debris via the inlet, the conduit system shaped to separate the fluid from the debris within the conduit system,
    wherein the conduit system is configured to direct a portion of the debris out of the first conduit and into the cavity of the body via the first outlet, and
    wherein the conduit system is configured to direct a portion of the fluid out of the first conduit toward the second conduit, and out of the second conduit via the second outlet, and
    wherein the first conduit comprises:
        a tubular body;
        an elongate body disposed within the tubular body;
        one or more than one blade extending from the elongate body; and
        one or more than one drag feature disposed on or in an internal surface of the tubular body, wherein the elongate body, the one or more than one blade, and the one or more than one drag feature control one or more characteristics of the fluid mixture within the conduit system.

12. The filter of claim 11, wherein the first and second surfaces of the body are manufactured of a material composition, and the conduit system are manufactured of the same material composition.

13. The filter of claim 11, wherein the one or more than one drag feature comprises a plurality of depressions defined into the internal surface of the tubular body.

14. The filter of claim 11, wherein the one or more than one drag feature comprises a plurality of protrusions extending from the internal surface of the tubular body.

15. The filter of claim 11, wherein the one or more than one drag feature is separate and distinct from the elongate body and the one or more than one blade.

16. The filter of claim 1, wherein the one or more than one drag feature comprises a plurality of depressions defined into the internal surface of the tubular body.

17. The filter of claim 1, wherein the one or more than one drag feature comprises a plurality of protrusions extending from the internal surface of the tubular body.

18. The filter of claim 1, wherein the one or more than one drag feature is separate and distinct from the elongate body and the one or more than one blade.

19. The filter of claim 1, where the one or more than one drag feature comprises a plurality of elongated structures extending away from the internal surface of the tubular body.

20. The filter of claim 11, where the one or more than one drag feature comprises a plurality of elongated structures extending away from the internal surface of the tubular body.

* * * * *